Patented Feb. 13, 1951

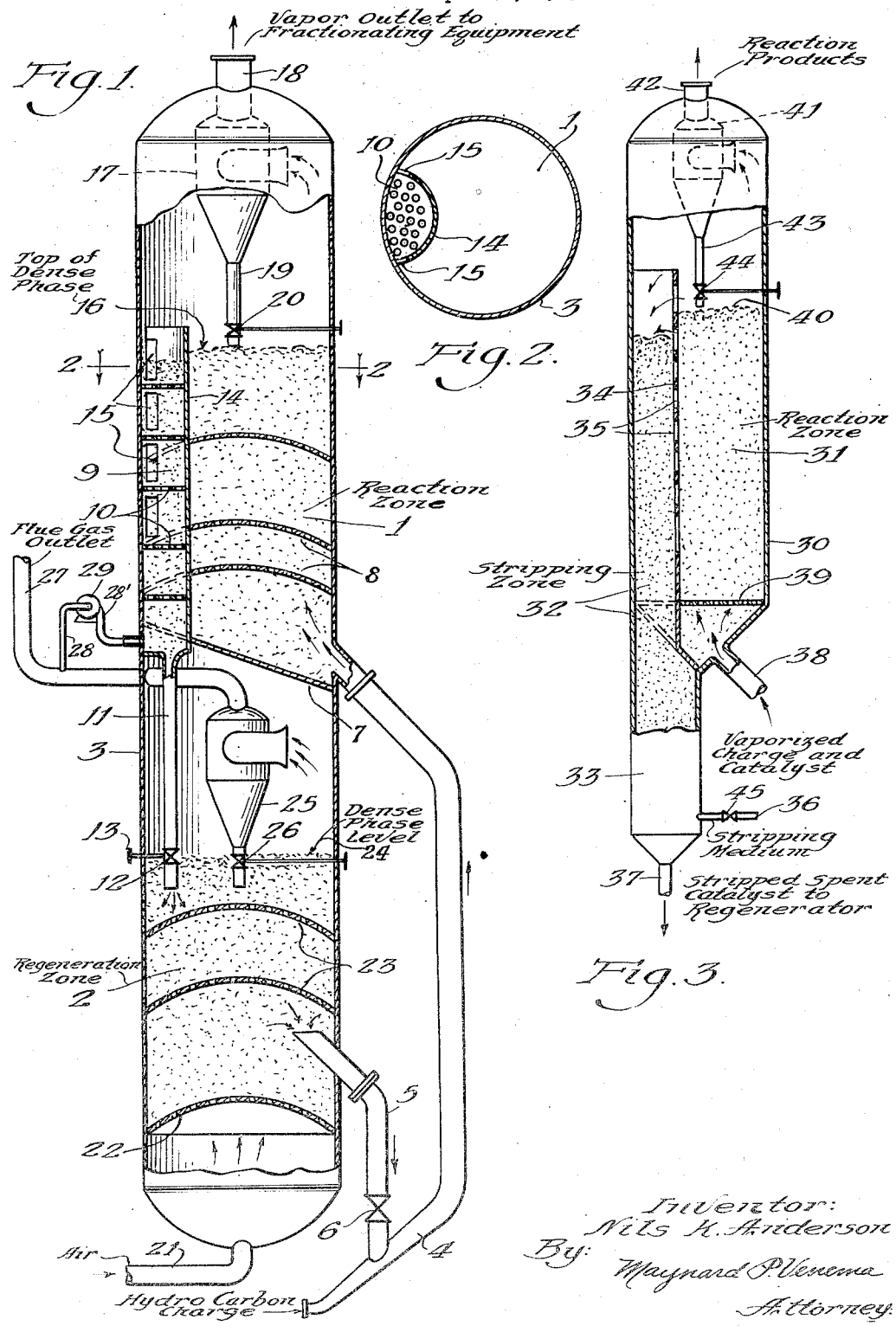

2,541,186

UNITED STATES PATENT OFFICE 2,541,186

CATALYTIC CONVERSION OF HYDROCARBONS

Nils K. Anderson, Elmhurst, Ill., assignor to Universal Oil Products Company, Chicago, Ill., a corporation of Delaware Application September 29, 1945, Serial No. 619,408

3 Claims. (Cl. 23—1)

This invention relates to an improved process and apparatus for the catalytic conversion of hydrocarbons wherein a fluidized finely divided catalyst is employed in a continuous conversion process. More specifically, the invention is directed to improvements in the means and apparatus for stripping catalyst particles of occluded and adsorbed volatile hydrocarbons prior to regeneration; the improvements providing more efficient stripping and at the same time allowing more flexibility in the operation of the conversion unit.

The improved apparatus has an elongated stripping zone provided within or at least partially within the reaction chamber, such that the upper portion of the stripping zone extends parallel to and is communicative with the reaction zone. The partitioning means between the conversion zone and stripping zone is provided with slots or perforations spaced throughout its height within the conversion zone, such that the height of the catalyst dense phase may be varied without affecting the withdrawal of the spent catalyst into the stripping zone.

In the fluidized type of catalytic conversion unit, a dense bed of subdivided solid catalyst is maintained within a reaction zone in a state of hindered settling by a continuous stream of vaporous or gaseous reactants in order to efficiently contact the catalyst particles. A stream of contaminated catalyst particles, upon which deleterious heavy carbonaceous products are deposited, is continuously withdrawn from the fluid bed in the reaction zone to a regenerating zone wherein the contaminants are removed to restore the catalytic activity of the particles. The particles in the regenerating zone are maintained in a fluidized state of hindered settling by a continuous stream of oxidizing gas which effects burning and removal of the deleterious carbonaceous material on the particles. In the truly fluidized operations, the rate of flow of the reactants or of the oxidizing gas stream must be rapid enough to obtain good contact with the catalyst particles and maintain them in a constant state of hindered settling. However, in the normal operation of the unit, above the dense phase beds in the reaction and regeneration zones, a light phase region exists in which there is little or no hindered settling and there is a substantially lower concentration of catalyst particles. From the light phase region within the reaction zone, the reaction products may be separated from the catalyst particles and discharged to a fractionation system or other treating equipment. From the light phase region within the regeneration zone, the combustion products and flue gases may be separated from the catalyst particles and be discharged directly to the atmosphere or they may first be sent through suitable heat recovery apparatus.

Catalyst particles which are withdrawn from the reaction zone are, of course, suspended in hydrocarbon gases or vapors until a gaseous stripping medium displaces it. It is very beneficial to displace the hydrocarbons as well as occluded volatile material on the catalyst particles in order to decrease the load on the regeneration system and aid in the control and the elimination of excessive temperatures during the regeneration process. The stripping medium may be steam, flue gas, or other relatively inert noncombustible gaseous material which can be mixed with the reaction products without adversely affecting the quality of the products or which can be easily separated therefrom. The contaminated catalyst from the reaction or conversion zone is normally removed in a downwardly moving column and a stripping medium injected at the lower end of the catalyst column in order to pass countercurrent to the descending catalyst particles. The stripping medium and the displaced hydrocarbon vapors and volatile material will then be carried upwardly to the upper region of the conversion zone to commingle with the conversion products and be discharged from the chamber therewith, to the fractionation or other treating equipment.

One of the important features of this invention resides in providing a slotted or perforated means to separate the stripping zone and the reaction zone, such that improved flexible operation within the reaction zone is made possible.

It is also an object of the invention to provide a compactly arranged fluidized catalytic conversion unit, that combines the reaction and regeneration zones within one chamber or shell thereby eliminating much of the transfer piping and entirely enclosing a stripping zone between the reaction and regeneration sections of the unit.

A still further feature of the invention resides in providing an improved continuous flow and method of handling fine subdivided catalyst and vaporous material through an improved compact arrangement of zones for the fluidized conversion of hydrocarbons.

In the compact fluidized conversion unit provided by this invention, the reaction zone is placed above the regeneration zone within a single vertically positioned chamber. A substantially horizontal separation plate is positioned across the chamber to separate the reaction and the regeneration portions of the unit. Passing through this separation plate, a vertically positioned catalyst withdrawal and stripping section is provided, in order to accommodate a downwardly moving column of contaminated and spent catalyst which must be transferred from the reaction zone to the regeneration zone.

In operation, the hydrocarbon charge materials and the catalyst are charged to the lower end of the reaction zone and are maintained in a dense fluidized bed within the lower portion of this zone. Suitable grids or perforated plates may be spaced within this reaction zone to effect good contact between the hydrocarbon charge and the catalyst particles throughout the entire height of the dense phase bed. In the upper portion of the reaction zone within the light phase region, a suitable centrifugal or cyclone type separator may be placed to effect a separation of catalyst particles from the reaction products which are discharged from the chamber. A long vertical partition plate or a pipe, having slotted or spaced perforations, is provided to form adjoining and parallel reaction and stripping zones, and permit a varying height dense phase bed within the conversion zone. The withdrawal of spent catalyst particles from the reaction zone can be made laterally through the slots or openings directly into the adjacent stripping section, wherein the particles may be passed downwardly through the zone countercurrent to a stripping medium which enters the lower end of the stripping zone or transfer conduit. As has previously been noted, the stripping medium may be steam, flue gas, or other inert fluid material. In the combined unit of this invention, the used or spent catalyst after passing through the stripping zone is passed directly to the upper level of the dense phase bed which is maintained within the regeneration zone. A substantially countercurrently flowing stream of air or other oxidizing gas, is maintained in the regeneration section to fluidize and reactivate the catalyst particles. Suitable distribution plates or grids may also be placed at spaced levels within this regeneration zone to effect a uniform burning, to aid in the redistribution of the catalyst and result in an efficient regeneration of the contaminated catalyst particles. The regenerated catalyst particles are withdrawn from the lower portion of the regeneration section and are passed through suitable conduits and flow control means, which are positioned outside the wall of the chamber, to become mixed with the hydrocarbon charge and reenter the reaction zone. In the upper portion of the regeneration section within the light phase region, a suitable centrifugal or cyclone-type of separator may also be placed to effect removal of substantially all of the catalyst particles from the flue gas stream which is discharged from the chamber. A portion of the outgoing flue gas stream may be charged to the lower end of the stripping zone to be used as the stripping medium therein. Also, if desired, this portion of flue gas used for stripping may be suitably washed or scrubbed prior to its use through the stripping zone.

A very considerable advantage is obtained by placing slots or perforations in the partition plate throughout its height in the reaction section, as the operating depth of the dense phase bed of catalyst and vapor may then be readily varied to any desired height, and spent catalyst still permitted to be withdrawn into the stripping zone and transfer line to the regenerator. For example, with fresh catalyst particles having a high activity it may be necessary to maintain only a very low or shallow dense phase bed of catalyst and vapor in the reactor to obtain adequate conversion. With a relatively inactive catalyst it may be necessary to maintain a bed of considerable depth within the reactor to obtain proper residence or contact time for the required conversion, assuming of course, in each instance, that the hydrocarbon charge is fixed or substantially constant. It is not new to have a stripping zone built partially within the reactor chamber and extending into the conversion zone; however, with a fixed non-perforated partition plate it is necessary that the catalyst be withdrawn down into the withdrawal and stripping zone, and therefore any operating changes in the level of the dense phase bed must be made above the top extremity of a solid non-perforated partition plate. This means that more vertical space or a higher reaction zone is necessary. Also, with a fixed height for an internally placed stripping zone, there may be considerable by-passing of relatively unspent catalyst into the stripping zone, particularly when the reactor is in operation maintaining a high level for the dense phase bed and the top end of the stripping zone is some distance below the top level of the bed. It is always preferable to withdraw catalyst from the upper portion of the dense phase bed where the catalyst is likely to have the greatest amounts of carbonaceous material and occluded matter adsorbed thereon and this is made possible with the improved elongated stripping section provided by this invention.

Many advantages are also found in the improved fluidized operation which is made possible by placing the reaction section directly above the regeneration section within a single chamber. The heating up of the unit prior to placing it into operation is made much easier, as the air heater which furnishes the warming up air, may be placed directly below or adjacent the lower end of the combination chamber. The spent catalyst from the reaction zone can be passed directly through an intermediate stripping zone and through a drop pipe to the upper level of the dense phase bed in the regeneration zone thereby easily attaining countercurrent flow in the regeneration section, between the catalyst particles and an oxidizing gas stream which may enter the lower end of the regeneration zone.

With countercurrent flow of the spent catalyst and air in the regeneration zone, it is possible to utilize the upper portion of this zone as a secondary stripping section, for the operation within the regenerating zone may be controlled so that the gases at the top of the dense phase bed are substantially flue and combustion gases which have very little or no oxygen present. Thus, the inert flue gas may be employed to function as a secondary stripping medium at the upper level of the bed where the spent catalyst is received from the reaction zone and the primary stripping zone above. Also as may be noted in connection with the accompanying drawing, a flue gas stream from the regeneration zone may be readily used to function as the stripping medium in the primary stripping zone which will be directly above the regeneration zone.

Still other advantages are realized in the compact arrangement, such as eliminating a major portion of the catalyst transfer lines. This not only lowers the cost of the unit by saving piping, insulating material, expansion joints, etc. but it also eliminates much loss of heat from the unit.

Still other advantages will be apparent from the accompanying drawing and the description thereof.

Figure 1 shows a compact improved fluid catalyst conversion unit, with the reaction section superimposed above the regeneration section.

Figure 2 shows a sectional plan view through the upper portion of the unit shown in Figure 1 as indicated by line 2—2.

Figure 3 shows an elevational view of a reactor chamber, where the stripping zone is partially within the chamber adjacent the reaction zone, and a slotted partition plate is used to separate the two zones.

Referring now to Figure 1 of the drawing a hydrocarbon and catalyst contacting zone or reaction zone 1 is placed above a catalyst regeneration zone 2 within a single vertically placed chamber 3. The fluid charge and the finely divided catalyst particles are carried to the reaction zone by way of conduit 4, the regenerated catalyst particles being withdrawn from the regeneration zone through the conduit 5 and fed into the conduit 4. The valve 6 is placed in the line 5 to provide control for the flow of the regenerated catalyst. The reactants and catalyst are charged to the lower end of the reaction zone 1 at a point just above a separation plate 7 which is placed across the chamber. Substantially horizontal distributing grids or perforated plates 8 are positioned at spaced points within the reaction zone 1, and serve to aid in the contact required between the reactants and catalyst particles.

Spent and contaminated catalyst is passed from the conversion zone 1 into the adjacent well or stripping zone 9 and caused to flow downwardly through this stripping section to the regeneration zone 2 below. Relatively open grids or perforated plates 10 are spaced within this stripping zone 9 to effect redistribution and good contact between the catalyst particles and the countercurrently flowing stripping medium which enters the lower end of the stripping zone. Control of catalyst flow through the pipe 11 and stripping zone 9 is maintained by the valve 12 which has an extended stem and control wheel 13 carrying to a point exterior of the chamber wall 3.

The partition plate 14, between the stripping zone 9 and reaction zone 1 within the upper section of the chamber, is provided with slots 15. Thus, spent catalyst may be allowed to pass laterally into the well and stripping zone 9, even though the top level of the dense bed, indicated by the broken line 16, is below the top of partitioning plate 14. The spaced slots 15 permit a varying height of the dense phase bed in the reaction zone and thus comprise a valuable improvement, making a more flexible operation of the unit possible. In the modification shown in Figures 1 and 2, the catalyst beds in the reaction and stripping zones extend to near the uppermost slots 15, with the bed in the reaction zone being slightly higher than the bed in the stripping zone. Also, the flow of stripping medium is controlled to obtain a greater density of catalyst particles in the stripping zone than in the reaction zone. As a result, catalyst particles are transferred from the reaction zone to the stripping zone only through the uppermost slots 15.

Within the upper portion of the reaction zone 1 above the normal top level of the dense phase bed a cyclone type of separator 17 is indicated which serves to separate the catalyst particles from the reaction products. The reaction products are discharged from the vessel by way of outlet 18 to suitable fractionating and treating equipment, which is not illustrated, while the separated catalyst particles are returned to the dense phase portion of the zone through a suitable return pipe 19. The valve 20 with the extended handle is operative to control the return flow of the separated catalyst particles to the contacting zone within the dense phase bed.

Within the regeneration zone 2, the contaminated catalyst particles, which are discharged thereto from the drop pipe 11, are contacted in a fluidized bed with an oxygen containing stream to effect burning of the contaminants thereon and thus regenerate the catalyst. The oxygen containing stream or air is charged to the lower portion of the regeneration zone 2 by way of conduit 21 and passes through a perforated plate 22 to contact the catalyst particles in a dense phase bed in which the catalyst is maintained in a state of hindered settling. Additional perforated plates or grids 23 are placed across the regeneration zone 2 and serve to act as redistribution grids for the catalyst and air streams as well as serve to divide the zone into vertical stages of regeneration. The plates 23 will, of course, have a substantially greater per cent of openings than the lower plate 22 which passes the upwardly moving air stream only. Withdrawal of regenerated catalyst is made from this zone 2 as indicated by way of conduit 5 which joins the charge conduit 4.

In the upper portion of the regeneration zone 2 above the top of the normal dense phase level, which is indicated by the broken line 24, a second cyclone type of separator 25 is positioned. This separator 25 serves to separate the catalyst particles from the combustion gases or flue gas stream and return the particles to the dense phase bed within the regeneration zone 2. The valve 26, with the handle extended to a point exterior of the chamber wall 3 and positioned at the lower end of separator unit 25, serves to control the return flow of the separated catalyst particles. The flue gas stream from the separator 25 is discharged from the chamber by way of outlet 27, from which it may be carried to a stack or to suitable heat recovery equipment, such as a waste heat boiler or the like, (not shown).

A portion of the flue gas stream from the regeneration zone may conveniently serve as a stripping medium, in the flow arrangement of the compact unit shown, a flue gas stream is withdrawn through conduit 28' and passed through a small compressor 29 which charges the stream at a suitable rate and pressure through conduit 28 to the lower end of the stripping zone 9 to pass upwardly therethrough countercurrent to the downwardly moving column of spent catalyst. Of course, an auxiliary stream of steam or other inert medium may be injected into the pipe 28' to pass upwardly through the stripping zone 9.

In Figure 2 of the drawing a sectional plan view is shown through the upper reaction zone 1 and stripping section 9. The partition plate 14 is shown to be a segmental portion of a cylinder with the slots 15 placed adjacent the chamber wall 3; however, the stripping zone 9 may be rectangular or any other desired shape. Also, the grids 10 within the stripping section may be grating, perforated plate, or the like, or of course, conventional types of contact trays and decks may be employed.

In Figure 3 of the drawing a reactor chamber 30 is shown which is maintained separate from the regenerator chamber. A slightly different form of apparatus is shown in this view, as compared to that illustrated in the compact form of the entire fluidized unit of Figure 1. The chamber 30 houses the reaction zone 31 and the upper portion of a stripping zone 32 which partially extends below the reactor zone 31 into a smaller cylindrical chamber 33. The partition plate 34, between the reaction zone 31 and the upper withdrawal section of the stripping zone, is provided with vertically spaced slots 35. As in the chamber of Figure 1, the slots in the partition plate provide for an improved method of receiving spent catalyst and stripping its efficiently in an elongated zone with a countercurrently flowing gaseous medium. The stripping gas may be charged through line 36 at the lower end of the zone 32, the rate of flow being controlled by valve 45, while catalyst particles substantially stripped of contaminating and volatile material, may be discharged through conduit 37 at the lower end of the stripping zone.

In operation the vaporized hydrocarbon charge and finely divided catalyst particles are carried by way of the inlet conduit to the lower end of the reaction zone 31, at a suitable temperature for conversion. The mixture is passed through a distributing grid or perforated plate 39 and is maintained in a dense phase bed, the upper extremity of which is indicated by the broken line 40. The reaction or conversion products resulting from contact with the catalyst are separated from the particles by a suitable centrifugal or cyclone type of separator 41 before being discharged from the chamber 30 by way of outlet 42. The separator 41 is placed in the upper portion of the reaction zone 31 above the dense phase bed but within the chamber 30. Separated catalyst particles are continuously returned to the dense phase catalyst bed through pipe 43, with the control of flow being maintained by valve 44.

Spent catalyst from the reaction zone will pass from the upper portion of the dense phase bed through the slots 35 into the stripping zone 32. By maintaining a lower velocity stripping gas stream, as compared to the rate of flow in the reaction zone, the travel of catalyst particles will always be principally from the upper portion of the bed into the stripping zone 32, regardless of the height of the dense phase bed, since the lower relative velocity will result in a more dense catalyst phase within this zone 32. The higher density catalyst column in the stripping zone 32 prevents any by-passing of catalyst into the lower slots 35 from the lower portion of the dense phase bed. While there may be some outward circulation of catalyst from the stripping zone 32 into the reaction zone 31, it will be very slight and not be detrimental in any respect to the conversion process taking place. The stripping medium entering line 36 as previously noted may be steam, flue gas, or any suitable inert gaseous medium.

A great amount of flexibility in the operation of the reaction chamber is attained by the improved method of withdrawing spent catalyst from the reaction zone through the slots into the elongated stripping zone. Any height of dense phase bed may be maintained as required by the activity of the catalyst or the residence time desired for contacting the catalyst and vapor mixture. In addition, a more uniform stripping operation and a more uniform conversion of the reactants is obtained by this improved apparatus and method of operation.

In operating the unitary and improved apparatus of Figure 1 several advantages are attained. The catalyst travel is greatly decreased, with conduits necessary only to transfer the regenerated catalyst from the regeneration section 2 to the reaction section 1. The spent catalyst from the reaction zone 1 travels entirely within the chamber wall 3, being transferred through the improved stripping zone 9 downwardly to the regeneration zone 2. In this unit, flue gas is utilized to pass upward countercurrently to the spent catalyst in the stripping zone 9 and to effect displacement of hydrocarbon vapors or other volatile matter being entrained with the catalyst. Also as previously mentioned, flue gas at the top of the dense phase bed above the upper distribution plate 23 may be employed to act as a stripping medium in a secondary stripping operation, within the regeneration zone.

The major portion of the flue gas from the regeneration section of course passes through the separator 25 and is discharged from the unit. The separated catalyst particles from the separator 25 and the stripped spent catalyst particles from the reaction zone 1 are charged to the upper portion of the fluidized bed, with the oxidizing air stream charged to the lower end of the zone through conduit 21. The elevated reaction zone 1 makes this desirable countercurrent flow within the regenerator section very easily attainable. This flow is of advantage, resulting in very efficient regeneration and in addition decreases the chances of excessive temperatures and after burning in the light phase region of the regenerating zone 2. Since the catalyst with the greatest amount of carbonaceous matter and entrained oxidizable material is brought into the upper part of the zone where the least amount of oxygen is present in the gas, while catalyst with the least amount of contaminating material is present in the lower portion of the zone above the grid 22 where the air or oxidizing gas stream first enters the catalyst bed and is high in oxygen content.

In the specific forms of the apparatus shown and described it is obvious various changes or substitutions may be made in their construction. For instance, no invention would be involved in using different types of catalyst separators, or in using different grids or distributing plates, which may be of various conventional types. The orientation and the shape of the stripping zone may vary; also, the placing of the slots or openings in the partitioning means within the reaction zone may be varied somewhat as may be noted in the changing of their positions in Figures 1 and 3 of the drawing.

The improved method of the flow and apparatus of this invention is not limited to any one conversion process, as it may be used for the catalytic cracking of hydrocarbons, catalytic dehydrogenation, catalytic aromatization or other similar fluidized processes.

I claim as my invention:

1. In a process for the conversion of fluid reactants in the presence of subdivided solid catalyst particles wherein the reactants are contacted at conversion conditions with catalyst particles in a reaction zone and the reaction products are separated from said catalyst particles and discharged from the reaction zone, the improvement which comprises passing contaminated catalyst particles from the reaction zone laterally through a partition having vertically spaced openings into an adjoining stripping zone, passing a fluid stripping medium upward through said stripping zone, controlling the flow of said stripping medium to obtain a greater density of catalyst particles in said stripping zone than in said reaction zone, maintaining said contaminated particles in the stripping zone as a dense fluid bed extending to an elevation adjacent an open portion of said partition, maintaining the catalyst particles in the reaction zone as a dense fluid bed extending to a slightly higher elevation than said bed in the stripping zone but below the top of said partition, transferring catalyst particles from the reaction zone to the stripping zone only from said higher elevation in the reaction zone to said elevation in the stripping zone through said open portion of the partition, passing the stripping medium and stripped volatile matter from the upper portion of said stripping zone to the upper end of said reaction zone to be discharged therefrom with said reaction products and discharging stripped contaminated catalyst particles from the lower end of said stripping zone for regeneration.

2. In a process for the conversion of fluid reactants in the presence of subdivided solid catalyst particles wherein the reactants are contacted at conversion conditions, said catalyst particles being maintained in a fluidized state in a reaction zone, the reaction products are separated from said catalyst particles and discharged from the reaction zone, contacted catalyst particles are passed from said reaction zone to a regeneration zone wherein said catalyst particles are maintained in a fluidized state and reactivated by a gaseous oxygen containing stream, the improvements which comprise passing a mixture of reactants and catalyst to the lower end of said reaction zone, passing contaminated fluidized particles from said reaction zone laterally through a partition having vertically spaced openings to an adjacent stripping zone, passing a fluid stripping medium upward through said stripping zone, controlling flow of said stripping medium to maintain a greater density of catalyst particles within said stripping zone than in said reaction zone and to allow the downward travel of said catalyst particles, maintaining said contaminated particles in the stripping zone as a dense fluid bed extending to an elevation adjacent an open portion of said partition, maintaining the catalyst particles in the reaction zone as a dense fluid bed extending to a slightly higher elevation than said bed in the stripping zone but below the top of said partition, transferring catalyst particles from the reaction zone to the stripping zone only from said higher elevation in the reaction zone to said elevation in the stripping zone through said open portion of the partition, passing said stripping medium and stripped volatile material from the upper portion of said stripping zone to the upper end of said reaction zone to be discharged therefrom with said reaction products, discharging stripped contaminated catalyst particles from the lower end of said stripping zone to the upper portion of said regeneration zone, effecting fluidized contact between said contaminated catalyst particles and said oxygen containing gas stream in said regeneration zone, withdrawing reactivated catalyst from the lower portion of last said zone and returning it for reuse to said reaction zone and discharging flue gases from the upper portion of said regeneration zone.

3. In a process for the conversion of fluid reactants in the presence of subdivided solid catalyst particles wherein the reactants are contacted at conversion conditions, said catalyst particles being maintained in a fluidized state in a reaction zone, the reaction products are separated from said catalyst particles and discharged from the reaction zone, contacted catalyst particles are passed from said reaction zone to a regeneration zone wherein said catalyst particles are maintained in a fluidized state and reactivated by a gaseous oxygen containing stream, the improvements which comprise passing a mixture of reactants and catalyst to the lower end of said reaction zone, passing contaminated fluidized particles from said reaction zone laterally through a partition having vertically spaced openings to an adjacent stripping zone, passing a stripping medium of flue gas upward through said stripping zone descending therein, controlling the upward flow of said flue gas to maintain a greater density of catalyst particles within said stripping zone than in said reaction zone and to allow the downward travel of said catalyst particles, maintaining said contaminated particles in the stripping zone as a dense fluid bed extending to an elevation adjacent an open portion of said partition, maintaining the catalyst particles in the reaction zone as a dense fluid bed extending to a slightly higher elevation than said bed in the stripping zone but below the top of said partition, transferring catalyst particles from the reaction zone to the stripping zone only from said higher elevation in the reaction zone to said elevation in the stripping zone through said open portion of the partition, passing said flue gas stripping medium and stripped volatile material from the upper portion of said stripping zone to the upper end of said reaction zone to be discharged therefrom with said reaction products, discharging the stripped contaminated catalyst particles from the lower end of said stripping zone to the upper portion of said regeneration zone, effecting fluidized contact between said contaminated catalyst particles and said oxygen containing stream in said regeneration zone, withdrawing reactivated catalyst from the lower portion of said regeneration zone and returning it for reuse to said reaction zone and discharging flue and combustion gases from the upper portion of said regeneration zone.

NILS K. ANDERSON.

REFERENCES CITED

The following references are of record in the file of this patent:

UNITED STATES PATENTS

| Number | Name | Date |
|---|---|---|
| 1,873,783 | Osterstrom et al. | Aug. 23, 1932 |
| 2,341,193 | Scheineman | Feb. 8, 1944 |
| 2,378,542 | Edmister | June 19, 1945 |
| 2,414,852 | Burnside et al. | Jan. 28, 1947 |